US006055038A

United States Patent [19]

Asano

[11] Patent Number: 6,055,038

[45] Date of Patent: Apr. 25, 2000

[54] EXPOSURE SYSTEM AND METHOD OF FORMING FLUORESCENT SURFACE USING SAME

[75] Inventor: Masaaki Asano, Tokyo, Japan

[73] Assignee: Dai Nippon Printing Co., Ltd., Tokyo, Japan

[21] Appl. No.: 09/021,899

[22] Filed: Feb. 11, 1998

[30] Foreign Application Priority Data

Feb. 12, 1997 [JP] Japan .................................... 9-027595
Nov. 12, 1997 [JP] Japan .................................... 9-310572

[51] Int. Cl.[7] ............................ G03B 27/42; G03B 27/54

[52] U.S. Cl. ................................................ 355/53; 355/67

[58] Field of Search .................................... 355/402, 403, 355/44, 45, 53, 67; 430/5, 20, 22, 30, 321; 445/24; 313/484, 485

[56] References Cited

U.S. PATENT DOCUMENTS

| | | | |
|---|---|---|---|
| 5,116,271 | 5/1992 | Arimoto | 445/24 |
| 5,116,704 | 5/1992 | Kwon | 430/3 |
| 5,219,310 | 6/1993 | Tomo et al. | 445/24 |
| 5,504,599 | 4/1996 | Okibayashi et al. | 359/50 |
| 5,654,553 | 8/1997 | Kawakubo et al. | 250/548 |
| 5,703,433 | 12/1997 | Fujii et al. | 373/484 |
| 5,726,739 | 3/1998 | Hayata | 355/67 |
| 5,760,849 | 6/1998 | Omae et al. | 349/5 |
| 5,830,608 | 11/1998 | Ishiwata et al. | 430/7 |
| 5,860,843 | 1/1999 | Kasahara | 445/24 |

*Primary Examiner*—Safet Metjahic
*Assistant Examiner*—Hung Henry Nguyen
*Attorney, Agent, or Firm*—Flynn, Thiel, Boutell & Tanis, P.C.

[57] ABSTRACT

A exposure system for use in forming phosphor layers of a plasma display panel, capable of forming the phosphor layers with minimum light exposure, is provided. The exposure system is used in a process of forming the phosphor layers wherein the phosphor layers are formed first by forming photosensitive phosphor layer forming layers at least between barrier ribs facing each other, provided on a work substrate, and by exposing via a photomask, after alignment of the photomask with the work substrate, the photosensitive phosphor layer forming layers, and subsequently, developing, and heat treating same. The exposure system includes an exposure light source disposed such that divergent or diffused rays of light are radiated from above the photomask. With the exposure system, the light rays can reach to the underside of the photomask, preventing the shadow of the photomask from being cast on critical regions with the result that the phosphor layers in a desired shape can be formed with less light exposure than in the case of utilizing collimated rays of light.

3 Claims, 7 Drawing Sheets

EXPOSURE SYSTEM AND METHOD OF FORMING FLUORESCENT SURFACE USING SAME

BACKGROUND OF THE INVENTION

1. Field of the Invention

The invention relates to an exposure system for use in forming inorganic luminescent material (phosphors) layers in a plasma display panel (referred to hereinafter as PDP) in color, which is an emissive type flat-panel display utilizing electrical gas discharges, and a method of forming the phosphor layers using the exposure system.

2. Description of the Related Art

A PDP generally has a construction wherein two glass sheet substrates, each provided with a set of electrodes regularly arranged thereon, are disposed facing each other, and gases comprising mainly Ne, Xe, and the like are enclosed therebetween. Electrical discharges are caused to occur in minuscule cells disposed in close proximity of the electrodes when a voltage is applied between the sets of the electrodes, each cell emitting light for display. For display of information, the electrical discharges are caused to occur selectively at the respective cells arranged in a regular fashion so that light is emitted accordingly. There are two types of PDPs, one being a direct current (DC) type with the electrodes exposed to a discharge space, and the other an alternating current (AC) type with the electrodes covered by insulation layers. Both types are further classified into a refresh driving type and a memory driving type.

FIG. 1 is a view illustrating the construction of the AC type PDP by way of example, showing a perspective view thereof in a condition wherein a front sheet is separated from a rear sheet for convenience. As shown in the figure, two glass substrates 1 and 2, disposed in parallel with, and opposite to each other, are held at a predetermined interval by barrier ribs 3 arranged in parallel with each other on the glass substrate 2 serving as the rear sheet. Composite electrodes composed of a transparent electrode 4 for holding up electrical discharges and a metallic bus electrodes 5 are arranged in parallel with each other on the back surface of the glass substrate 1 serving as the front sheet, and a dielectric layer 6 is formed so as to cover the composite electrodes. Further, a protective layer 7 (MgO layer) is formed on top of the dielectric layer 6. On the front surface of the glass substrate 2 as the rear sheet, address electrodes 8 are formed in parallel with each other, and disposed between the barrier ribs 3 so as to cross the composite electrodes 5 at right angles. A phosphor substance layer 9 is provided covering sidewall surfaces of the barrier ribs 3 and the bottom surfaces of the cells. The AC type PDP is of a surface discharge type, and constructed such that electrical discharges are caused to occur in an electrical field set up in space when an a-c voltage is applied between the composite electrodes provided on the front sheet. In this case, the direction of the electric field to which the a-c voltage is applied changes according to frequency of the a-c. Ultra-violet radiation resulting from the electrical discharges causes the phosphor substance layer 9to emit light so that light transmitting through the front sheet can be visually recognized by viewers.

In the PDP described above, the rear sheet is fabricated by forming the address electrodes 8 on the glass substrate 2 first, forming the dielectric layer so as to cover same if necessary, forming the barrier ribs 3, and then providing phosphor layers, composed of the phosphor substance layer 9, between the barrier ribs facing each other. It is well known that the electrodes 8 are formed by patterning using the photolithographic techniques on an electrode material film formed on the glass substrate 2 by use of the vacuum deposition method, sputtering method, plating method, thick film techniques, and the like, or by patterning on a thick film paste using the screen printing method. Further, the dielectric layer is formed by the screen printing method, or the like, and the barrier ribs 3 are formed by overlap printing using the screen printing method, or by the sandblasting method, or the like. The phosphor layers are formed by a method of selectively filling up between the barrier ribs 3 with phosphor paste in three colors, red (R), green (G), and blue (B), by use of the screen printing method.

As described in the foregoing, the method of filling up directly between the barrier ribs facing each other with the phosphor paste in three colors by use of the screen printing, and thereafter, heat treating same is adopted for formation of the phosphor layers between the barrier ribs. However, there have been problems that it is difficult to manufacture screen frames for substrates in large sizes while deviation in size occurs, and it is also difficult to ensure accuracy in the case of high resolution types. Accordingly, a method of forming the phosphor layers by applying the photolithographic techniques to a photosensitive phosphor paste or a photosensitive phosphor film has been contemplated. Use of an exposure method utilizing collimated rays of light in such a case has been under study.

It is to be pointed out, however, that the exposure system utilizing collimated rays of light requires an optical system as shown in FIG. 2 to produce collimated rays of light accurate enough for forming a pattern consisting of lines and spaces on the order of several to several tens $\mu$m, leading to a higher cost of the exposure system itself. That is, in the optical system, rays of light emitted from a light source 10 are not directly radiated towards a work substrate 11, but adjusted by use of a reflective lens 12 and a collimating lens 13 such that intensity of radiation becomes uniform within the surface of the work substrate 11.

There is also a problem that it is difficult to form the phosphor layers in a desirable shape with the collimated rays of light. More specifically, in the photolithographic techniques, first phosphor layer forming layers are formed by coating throughout the work substrate with the barrier ribs formed thereon with a photosensitive phosphor paste and subsequently, drying same, or by heating and fitting by pressure a photosensitive phosphor film onto the work substrate with the barrier ribs formed thereon. Thereafter, the phosphor layers are formed by exposing via a photomask and developing the phosphor layer forming layers. This process is applied in a similar manner to the phosphor layer forming layers in different colors, forming the phosphor layers in three colors and heat treating same in the last step of the process. It is normally a desirable practice in the process to design a photomask 23 having openings in width matching an interval between barrier ribs 21 as shown in FIG. 3 for exposing a phosphor layer forming layer 22 between the barrier ribs 21. However, if the work substrate 11 is expanded, there is a likelihood that as shown in FIG. 4, exposing of the phosphor layer forming layer is made even at the top of some of the barrier ribs 21, or not made in a region by the sidewall of the other rib. As a result, as shown in FIG. 5, the phosphor layer is formed at the top of the rib 21, but not formed by the wall of the other rib facing the rib 21, in the vicinity of the top thereof, rendering the shape of the phosphor layer asymmetrical from side to side in section. Accordingly, since magnitude of expansion of the work substrate 11 can not be estimated beforehand, the photomask 23 is designed to have openings such that the photomask protrudes inside the interval between the barrier ribs 21 as shown in FIG. 6 to prevent formation of the phosphor layer at the top of the barrier ribs 21 even if the photomask 23 is slipped out of place. Still, with the use of the collimated rays of light, the phosphor layers become asymmetrical in shape from side to side. Furthermore, when exposure is made via the photomask 23, it becomes difficult to expose the phosphor forming layer in a region by the sidewall of respective barrier ribs 2l because of the shadow of the photomask cast thereon. In practice, however, as the phosphor substance itself emits light in white color, the light rays are scattered, exposing the region by the sidewall of the rib as well. However, the phosphor layer near the sidewall of the rib is exfoliated when developed due to low intensity of the scattered light rays. This problem is addressed to at present by increasing light exposure, however, this entails the necessity of increasing the intensity of the light source.

SUMMARY OF THE INVENTION

According to the invention, an exposure light source is put to use such that the shadow of the photomask is not cast on regions for the phosphor layers to be formed to solve the problems described hereinbefore. Use of the exposure light source enables formation of the phosphor layers in desired shape with less light exposure than in the case of using collimated rays of light.

An exposure system according to the invention is used in a process for forming phosphor layers of a PDP, wherein the phosphor layers are formed by forming photosensitive phosphor forming layers at least between barrier ribs facing each other, provided on a work substrate, and by exposing via a photomask the photosensitive phosphor forming layers, after alignment of the photomask with the work substrate, and subsequently, developing, and heat treating same. The exposure system further comprises an exposure light source disposed such that divergent or diffused rays of light are radiated from above the photomask.

DESCRIPTION OF THE PREFERRED EMBODIMENTS

Figure 7:
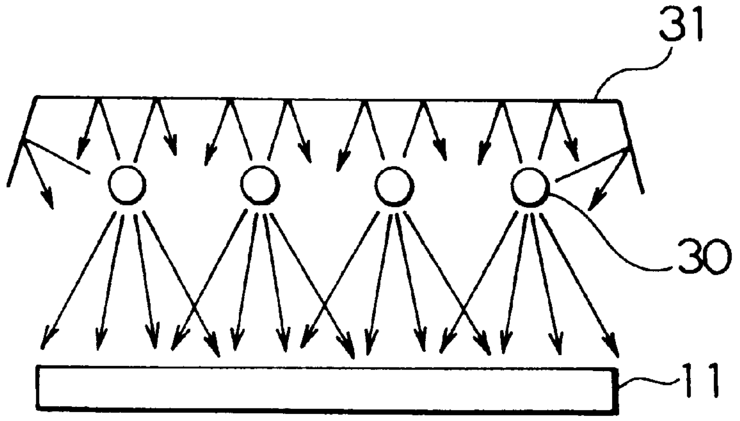
FIG. 7 is a schematic illustration of an exposure light source for radiating divergent rays of light.

As shown in FIG. 7, by way of example, an exposure light source for radiating divergent rays of light are composed of a plurality of light sources 30 disposed at an identical level from a work substrate 11. Thus, the divergent rays of light are directional with respect to each of the light sources 30. For the light source 30, an ultraviolet radiation fluorescent lamp, for example, is used. Also, as shown in FIG. 7, a reflector 31 composed of, for example, a metal plate or the like, having a mirror-like surface, may be disposed, if necessary, on the opposite side of the work substrate 11 against the light sources 30.

Figure 8:
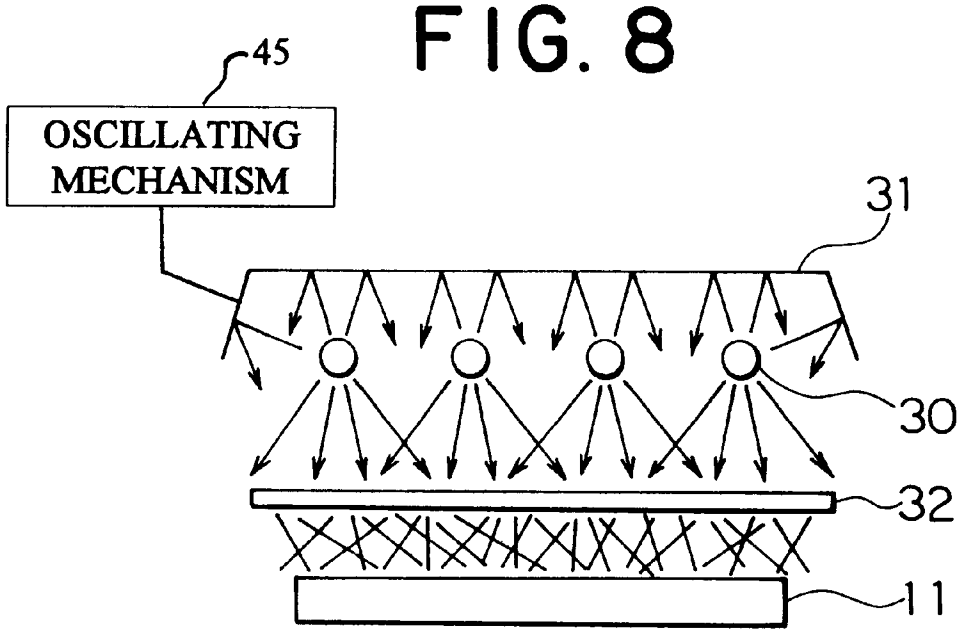
FIG. 8 is a schematic illustration of an exposure light source for radiating diff fused rays of light.

As shown in FIG. 8, by way of example, an exposure light source for radiating diffused rays of light are composed of a plurality of light sources 30, and a diffusion glass 32 disposed between the plurality of light sources 30 and the work substrate 11. The diffused rays of light are rays of light that are emitted from the light sources 30 and have lost directionality after passing through the diffusion glass 32. For the light source 30, an ultraviolet radiation fluorescent lamp, for example, is used. Also, as shown in FIG. 8, the reflector 31 composed of, for example, a metal plate or the like, having a mirror-like surface, may be disposed, if necessary, on the opposite side of the diffusion glass 31 against the light sources 30.Alternatively, the exposure light source for radiating diffused rays of light may also be provided by disposing a reflector having a reflection surface with projections and depressions on the opposite side of the work substrate 11 against the light sources 30 in place of the diffusion glass 32.

Figure 1:
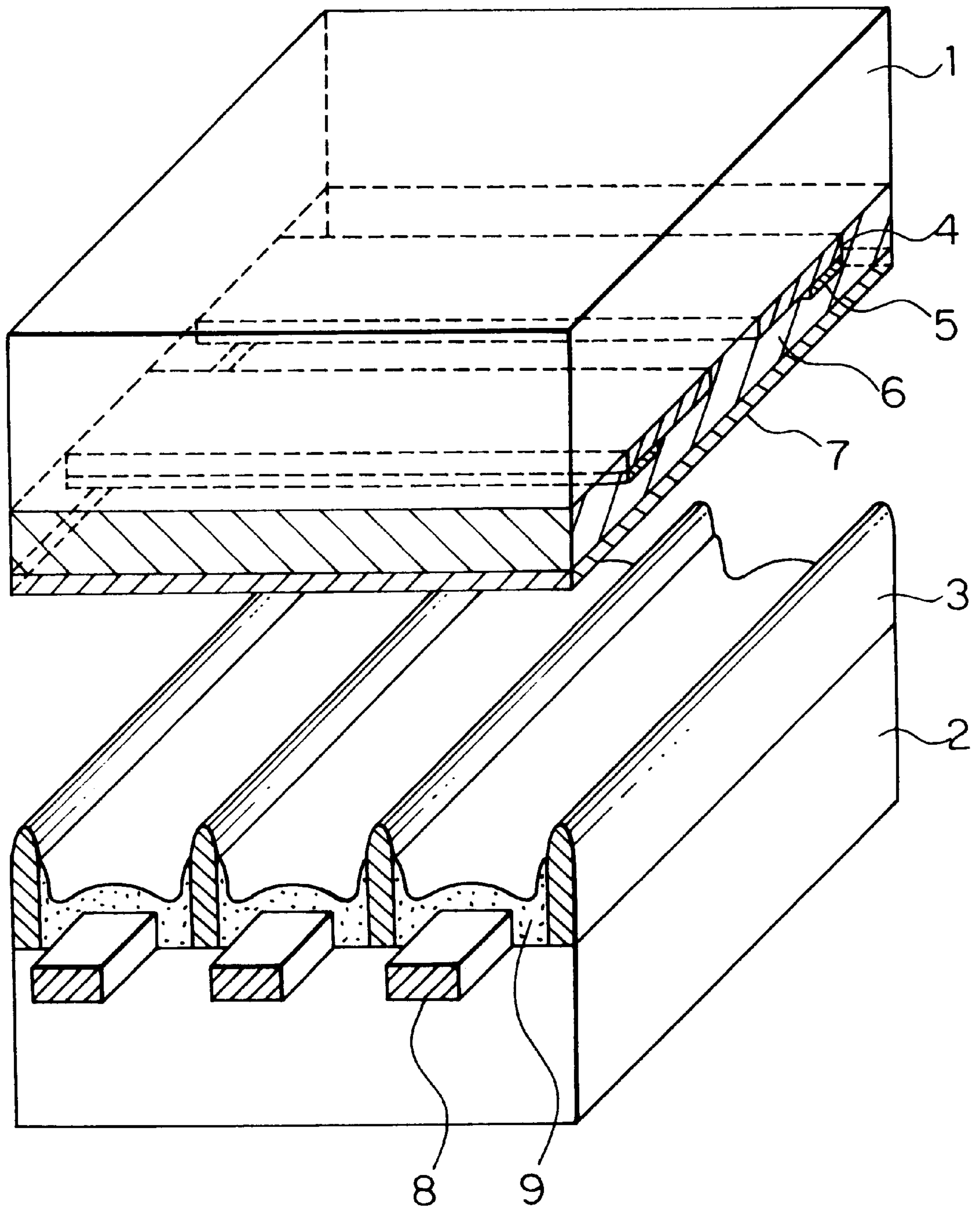
FIG. 1 is a perspective view illustrating the construction of an AC type PDP by way of example, showing the condition thereof with a front sheet being separated from a rear sheet for the sake of convenience.
Figure 2:
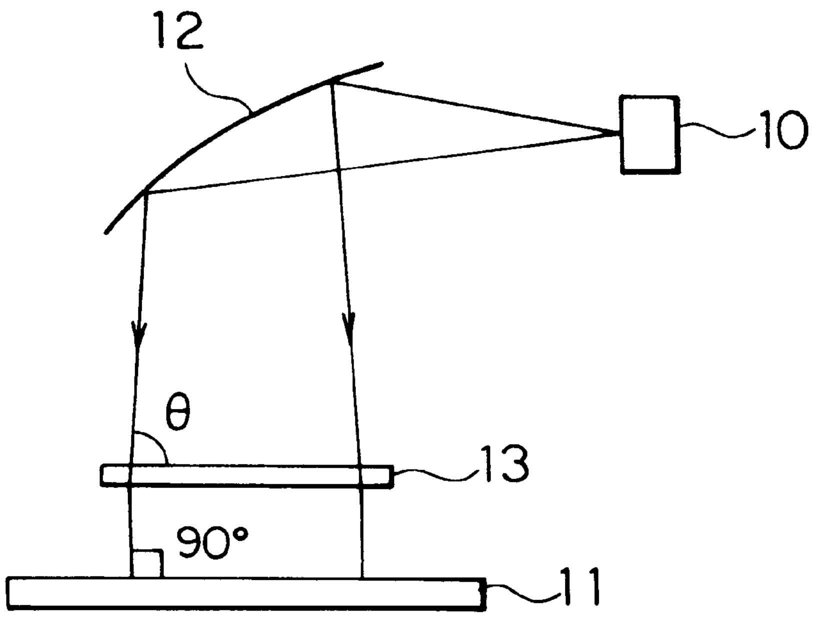
FIG. 2 (PRIOR ART)
FIG. 2 is a schematic illustration of an optical system of an exposure system for radiating collimated rays of light.
Figure 3:
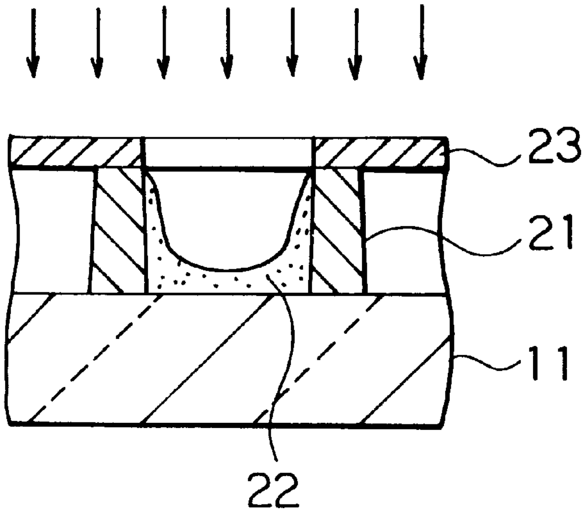
FIG. 3 is a sectional view illustrating an exposure process for forming a phosphor layer by photolithographic techniques.
Figure 4:
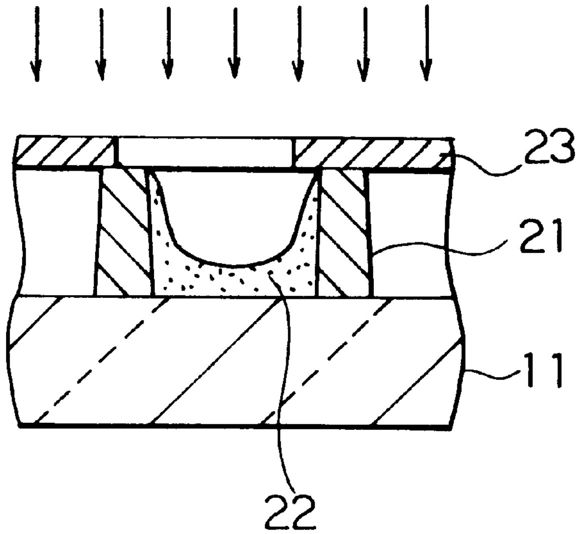
FIG. 4 is a sectional view illustrating the exposure process when a photomask is slipped out of place due to expansion of a work substrate.
Figure 5:
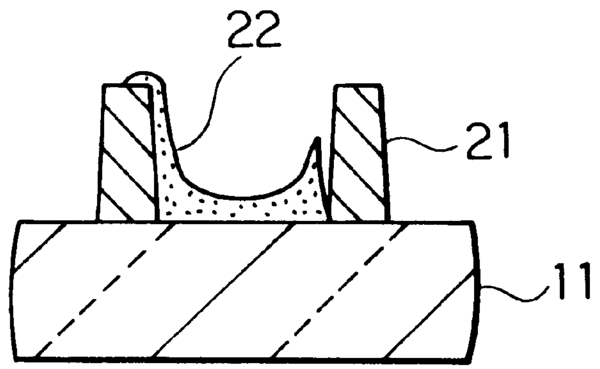
FIG. 5 is a sectional view of the phosphor layer formed by the exposure process in the condition shown in FIG. 4.
Figure 9:
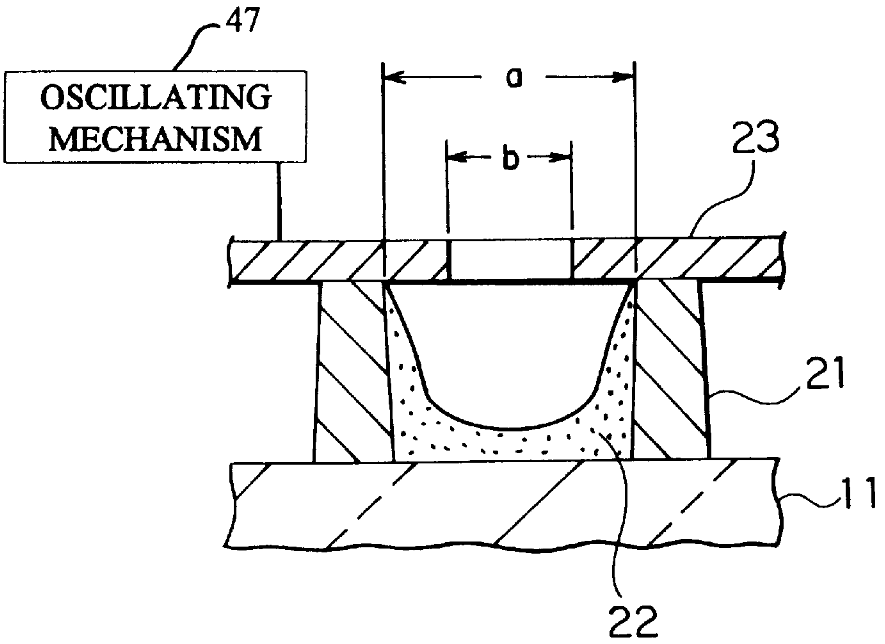
FIG. 9 is a view illustrating an interval between barrier ribs and width of an opening of the photomask.

In the exposure system for collimated rays of light, rays of light emitted from a light source 10 are converted into uniform collimated rays of light incident on the work substrate 11, at 90° with respect to the surface of the work substrate, by a collimating lens 13 via a reflective lens 12 as shown in FIG. 2. On the other hand, in the case of the exposure system according to the invention, utilizing divergent or diffused rays of light, adoption of the following practice is desirable. More specifically, a mechanism 45 of the exposure light source for oscillating the light source in relation to the photomask in alignment with the work substrate shown in FIG. 8, or conversely a mechanism 47 of the photomask in alignment with the work substrate for oscillating the photomask in relation to the exposure light source may preferably be installed, as shown in FIG. 9. Alternatively, a mechanism of the exposure light source traveling in relation to the photomask in alignment with the work substrate, or conversely a passing 49 mechanism shown in FIG. 10 of the photomask in alignment with the work substrate for passing the photomask below the exposure light source preferably may be utilized. In the case of the work substrate or the exposure light source being mobile as described above, the plurality of the light sources described above can be reduced to a single light source.

Figure 6:
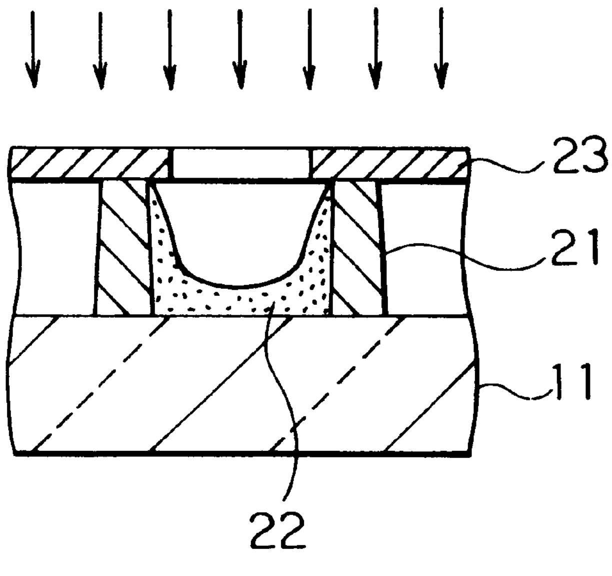
FIG. 6 is a sectional view illustrating the exposure process using a photomask designed taking into account the expansion of the work substrate.

With advance in scale-up and higher resolution of PDPs, alignment of the photomask with the work substrate becomes increasingly difficult even in the case of forming the phosphor layers by the photolithographic techniques with the use of the exposure system described above. As a result, the tops of adjacent barrier ribs are sometimes covered by the phosphor substance in the worst case. Such covering by the phosphor substance interferes with formation of a panel by joining the front sheet with the rear sheet. For prevention of such trouble, as shown in FIG. 6, a photomask with openings narrower in width than an interval between the barrier ribs, in which respective phosphor layers are formed may preferably be employed. More specifically, as shown in FIG. 9, contact exposure may preferably be performed by using a photomask meeting the conditions, a>2×b, wherein a is an interval between the barrier ribs facing each other and b is the width of respective openings of the photomask. Thus, width b>a/2.

Figure 10:
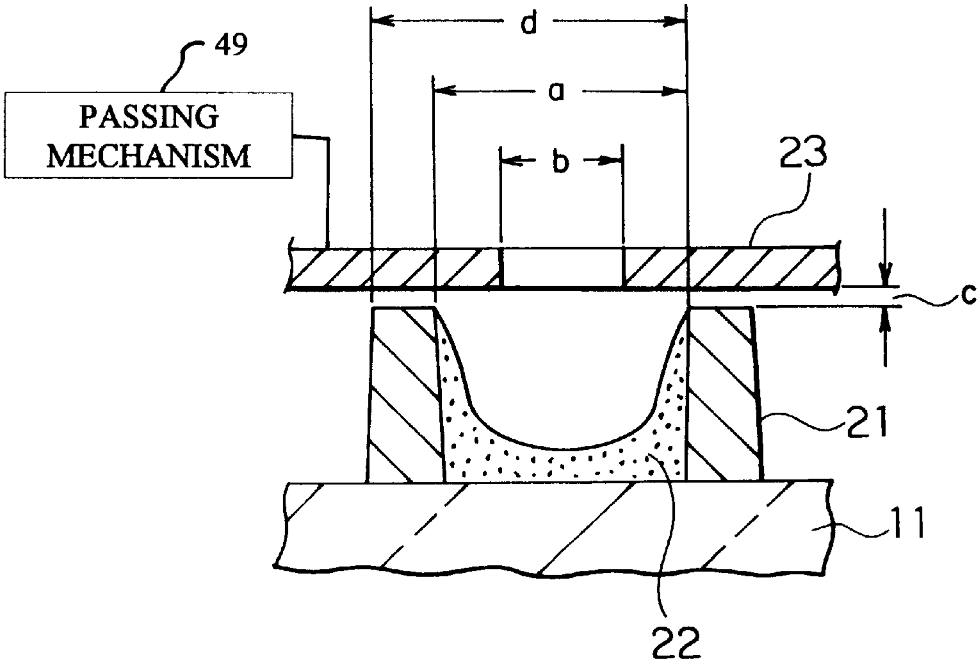
FIG. 10 is a view illustrating a gap between the tops of the barrier ribs and the opening of the photomask.

The contact exposure whereby the photomask is kept in intimate contact with the work substrate is preferable from the viewpoint of preventing the tops of the barrier ribs from being covered by the phosphor substance. However, the photomask which is a pattern of a chromium film or the like, formed on a glass sheet is susceptible in practice to damage when the pattern is butted against the tops of the barrier ribs. Hence, it is preferable to apply gap exposure wherein a gap is provided between the photomask and the tops of the barrier ribs. In this case, as the phosphor layers are formed on the tops of the adjacent barrier ribs if the gap is excessively large, an exposure method meeting the conditions, c<(a−b)/2, if c is a gap between the top of the rib and the photomask as shown in FIG. 10 may preferably be performed. This equation can be rewritten as b<a−2c where the preferred width of the photomask opening is controlled in part by the size of the gap c.

In applying the gap exposure under the conditions described above, it is still unavoidable that a portion of rays of light strikes at the tops of the barrier ribs. However, covering of the tops by the phosphor substance is to be prevented by adjusting light exposure and development.

Further, an exposure method with the gap c under conditions modified from the aforesaid condition, that is, c<(d−b)/2, if d is a pitch between the barrier ribs facing each other as shown in FIG. 10 may be performed. In this case, however, the phosphor layers are formed on the top of the barrier ribs although same are not formed by the wall of the adjacent barrier ribs. Therefore, such phosphor layers formed need to be removed by grinding the tops of the barrier ribs after formation of the phosphor layers in three colors.

Figure 11:
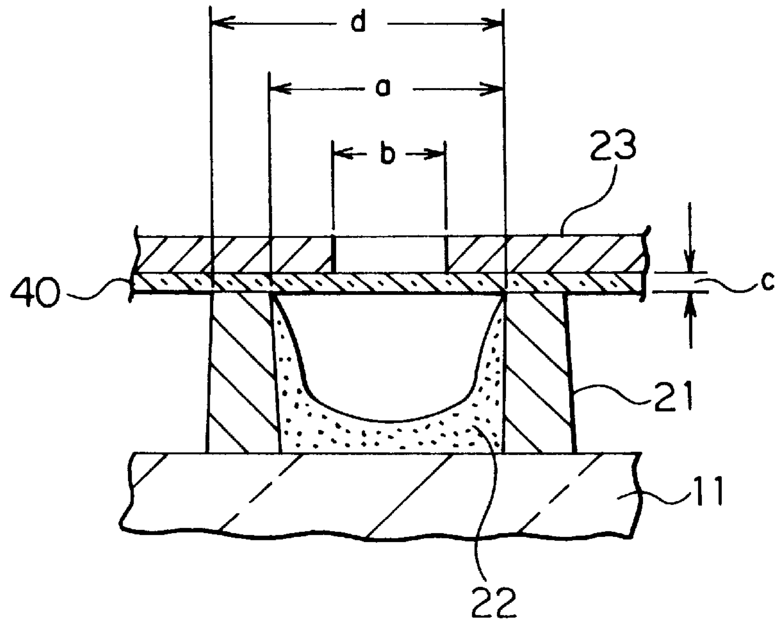
FIG. 11 is a view corresponding to FIG. 10 but illustrating a film disposed in the gap between the tops of the ribs and the photomask.

In the case of applying gap exposure, it is preferable to apply the gap exposure while a transparent film 40 having a thickness corresponding to the gap c is interposed between the top of the rib 21 and the photomask 23 as shown in FIG. 11. With such interposition of the film 40, the photomask 23 is prevented from being damaged because of cushioning by the film 40.

Figure 12:
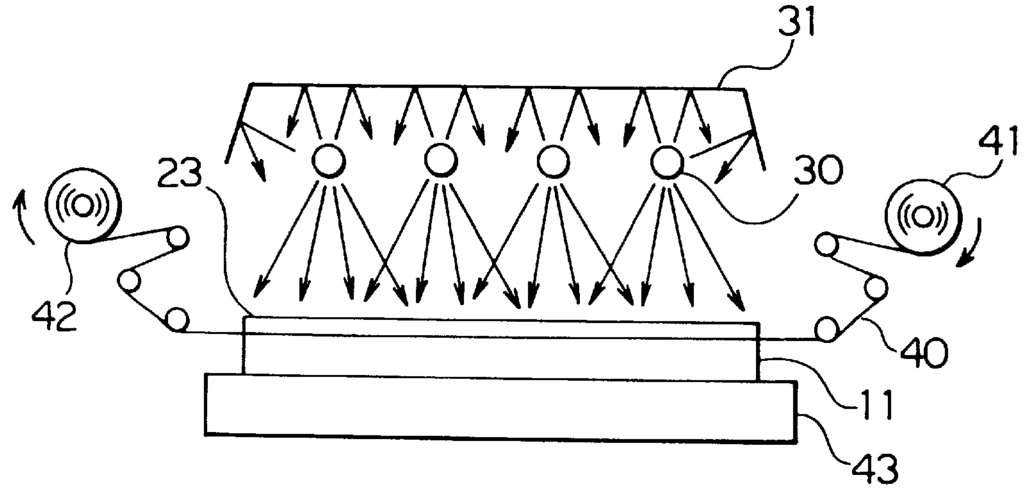
FIG. 12 is a schematic illustration of an apparatus for interposing the film between the photomask and the underlying substrate.

An apparatus for interposing the film 40 is shown in FIG. 12. In this apparatus, the film 40 is sequentially fed from an unwinding roll 41 around which the film 40 is wound to a winding roll 42 so that the exposure is performed while the new film 40 is always interposed. That is, a work substrate 11 is placed on a fixed board 43, then the film 40 passes along the unwinding roll 41, and the photomask 23 lowers on the film 40 so that the exposure is performed while the film 40 is interposed between the top of the barrier rib and the photomask 23. In the next exposure, the film 40 is fed to the winding roll 42 so that the new portion of the film 40 is interposed between the work substrate 11 and the photomask 23, and the part of the film 40 soiled by the phosphor powder and dust is not reused, thereby performing excellent exposure.

The film 40 may be bonded to the photomask 23 and the surface of the film 40 may be cleansed every time the exposure is performed.

Embodiment 1

A photosensitive phosphor paste was prepared by kneading and mixing, with a three-roll mill, 510 parts by weight of phosphor powders made of $Zn_2SiO_4$: Mn, 100 parts by weight of hydroxypropyl cellulose of 60,000 in average molecular weight, 100 parts by weight of pentaerythritol triacrylate, 10 parts by weight of 2-benzyl-2-dimethylamino-1-(4-morpholinophenyl)-butanol-0.5 parts by weight of methylhydroq-unione, and 300 parts by weight of 3-methyl-3-methoxy-1-butanol.

Meanwhile, a work substrate with electrodes and barrier ribs formed thereon was prepared on a glass substrate. The barrier ribs were formed such that each was 60 μm wide, and 150 μm high while the pitch between the barrier ribs facing each other was 200 μm. The phosphor paste described above was applied to the entire surface of the work substrate. More specifically, the phosphor paste was applied to a thickness of 30 μm from the bottom of the barrier ribs by use of the die coating method, and thereafter dried at 80° C. for 30 minutes in a clean oven. Then, with the use of the exposure system having the light sources for divergent rays of light, as shown in FIG. 7, the work substrate with the phosphor paste filled up between the barrier ribs thereon and was subjected to contact exposure, whereby the photomask was kept in intimate contact with the work substrate, at light exposure of 270 $mJ/cm^2$. In this instance, the photomask was provided with openings, each set at 50 μm, in width, against respective intervals 140 μm in length between the barrier ribs facing each other. Subsequently, developing was made under conditions of pressure at 1 kg /$cm^2$ and at a rate of 4.5 l/min by use of a spray type processor, and drying was applied at 90° C. for 30 min.

Embodiment 2

With the use of the same exposure system as was used in Embodiment 1, a work substrate provided with the same phosphor paste as in Embodiment 1 filled up between barrier ribs formed thereon was subjected to contact exposure at light exposure of 540 $mJ/cm^2$. Thereafter developing and drying was applied in the same way as for Embodiment 1.

Embodiment 3

With the use of the same exposure system as was used in Embodiment 1, a work substrate provided with the same phosphor paste as in Embodiment 1 filled up between barrier ribs formed thereon was subjected to gap exposure, whereby a gap of 70 μm was provided between the photomask and the work substrate, at light exposure of 540 $mJ/cm^2$. Thereafter developing and drying was applied in the same way as for Embodiment 1.

Embodiment 4

With the use of the exposure system having the light sources for diffused rays of light, as shown in FIG. 8, a work substrate provided with the same phosphor paste as in Embodiment 1 filled up between barrier ribs formed thereon was subjected to contact exposure at light exposure of 270 $mJ/cm^2$. Thereafter developing and drying was applied in the same way as for Embodiment 1.

Embodiment 5

With the use of the same exposure system as was used in Embodiment 4, a work substrate provided with the same phosphor paste as in Embodiment 1 filled up between barrier ribs formed thereon was subjected to contact exposure at light exposure of 540 $mJ/cm^2$. Thereafter developing and drying was applied in the same way as for Embodiment 1.

Embodiment 6

With the use of the same exposure system as was used in Embodiment 4, a work substrate provided with the same phosphor paste as in Embodiment 1 filled up between barrier ribs formed thereon was subjected to the gap exposure with the gap of 70 μm at light exposure of 540 mJ /cm$^2$. Thereafter developing and drying was applied in the same way as for Embodiment 1.

Comparative Example 1

With the use of a conventional exposure system having a light source for collimated rays of light, a work substrate provided with the same phosphor paste as in Embodiment 1 filled up between barrier ribs formed thereon was subjected to contact exposure at light exposure of 480 mJ /cm $^2$. Thereafter developing and drying was applied in the same way as for Embodiment 1.

Comparative Example 2

With the use of the conventional exposure system having a light source for collimated rays of light, a work substrate provided with the same phosphor paste as in Embodiment 1 filled up between barrier ribs formed thereon was subjected to contact exposure at light exposure of 2400 mJ /cm$^2$. Thereafter developing and drying was applied in the same way as for Embodiment 1.

Comparative Example 3

With the use of the conventional exposure system having a light source for collimated rays of light, a work substrate provided with the same phosphor paste as in Embodiment 1 filled up between barrier ribs formed thereon was subjected to contact exposure at light exposure of 7200 mJ/cm$^2$. Thereafter developing and drying was applied in the same way as for Embodiment 1.

Evaluation was made on shapes of phosphor layers formed in Embodiments 1 to 6, and Comparative Examples 1 to 3. Specifically, checking was made on whether or not the phosphor layers were made on the tops of the barrier ribs, and whether or not the phosphor layers were made between adjacent barrier ribs. The results of the evaluation are shown in Table 1.

TABLE 1

| | light source type | light exposure | formation of phosphor layers on the sidewalls of barrier ribs, up to near the tops | formation of phosphor layers between adjacent barrier ribs |
|---|---|---|---|---|
| Embodiment 1 | divergent rays of light | 270 mJ/cm$^2$ | yes | — |
| Embodiment 2 | divergent rays of light | 540 mJ/cm$^2$ | yes | — |
| Embodiment 3 | divergent rays of light, gap of 70 μm | 540 mJ/cm$^2$ | yes | none |
| Embodiment 4 | diffused rays of light | 270 mJ/cm$^2$ | yes | — |
| Embodiment 5 | diffused rays of light | 540 mJ/cm$^2$ | yes | — |
| Embodiment 6 | diffused rays of light, gap of 70 μm | 540 mJ/cm$^2$ | yes | none |
| Comparative Example 1 | collimated rays of light | 480 mJ/cm$^2$ | none | — |
| Comparative Example 2 | collimated rays of light | 2400 mJ/cm$^2$ | none | — |
| Comparative Example 3 | collimated rays of light | 7200 mJ/cm$^2$ | yes | — |

As can be seen from the above results, with the use of the exposure light sources for radiating either divergent or diffused rays of light, light exposure of 270 mJ/cm$^2$ was found sufficient to form the phosphor layers on the sidewalls of the barrier ribs, up to close to the tops of the barrier ribs, representing about one twentieth of that required in the case of collimated rays of light, that is, 7200 mJ/cm$^2$. In the case of applying the gap exposure with divergent or diffused rays of light from the viewpoint of avoiding intimate contact of the photomask with the work substrate, there is a risk of the light rays reaching between the adjacent barrier ribs, forming the phosphor layers in unnecessary regions. Test results show, however, that this did not occur even when gap exposure with a gap of 70 μm between the photomask and the work substrate was applied.

Embodiment 7

A plurality of work substrates provided with the same phosphor paste filled up between barrier ribs facing each other (an interval between the barrier ribs: 140 μm) as for the embodiment 1 were prepared and subjected to contact exposure with the use of photomasks having openings of various widths, respectively, and after development, drying was applied in the same way as in the case of embodiment 1. More specifically, eight different types of photomasks having openings, each 20, 30, 50, 70, 80, 100, 120, and 140 μm in width, respectively, were applied with the use of the exposure system having the light sources for diffused rays of light, as shown in FIG. 8. In this instance, contact exposure was applied at light exposure of 540 mJ/cm$^2$ by use of the exposure system provided (effective exposure range: 1000 mm×1400 mm) with 29 units of UV lamp "TL 80W/10R" manufactured by Philips and the diffusion glass. After tests, check-up was made to determine on whether or not the phosphor layers were formed on the tops of the barrier ribs in addition to the items of previous evaluation. Results of such evaluation are shown in Table 2.

TABLE 2

| width of each opening in photomask | formation of phosphor layer on side-walls of an rib, close to the top | formation of phosphor layer between adjacent barrier ribs | formation of phosphor layer on the top of respective barrier ribs |
|---|---|---|---|
| 20 μm | none | none | none |
| 30 μm | — | none | none |
| 50 μm | yes | none | none |
| 70 μm | yes | none | none |
| 80 μm | yes | none | yes |
| 100 μm | yes | none | yes |
| 120 μm | yes | — | yes |
| 140 μm | yes | yes | yes |

As can be seen from the above results, with the use of the photomasks having openings with width larger than a half of the length of the interval between the barrier ribs facing each other, the phosphor layers were formed on the tops of the barrier ribs, however, with the use of the photomasks having openings with width less than a half of that, same were not formed.

Embodiment 8

A plurality of work substrates provided with the same phosphor paste filled up between barrier ribs facing each other (an interval between the barrier ribs: 140 μm) as in the case of the embodiment 1 were prepared and subjected to gap exposure with the use of a photomask having openings 50 μm in width, and by varying a gap between the photomask and the tops of the barrier ribs. After development, drying was applied in the same way as in the case of embodiment 1. More specifically, the gap exposure was applied with the gap of 0 μm, 20 μm, 40 μm, 50 μm, 70 μm, 90 μm, and 100 μm, respectively. The same exposure system and same light exposure as was used for the embodiment 7 were adopted. After tests, check-up was made on the basis of the same items of evaluation as for the embodiment 7. Results of such evaluation are shown in Table 3.

TABLE 2

| gap | formation of phosphor layer on side-walls of an rib, close to the top | formation of phosphor layer between adjacent barrier ribs | formation of phosphor layer on the top of respective barrier ribs |
|---|---|---|---|
| 0 μm | yes | none | none |
| 20 μm | yes | none | none |
| 40 μm | yes | none | none |
| 50 μm | yes | none | yes |
| 70 μm | yes | none | yes |
| 90 μm | yes | — | yes |
| 100 μm | yes | yes | yes |

As can be seen from the above results, with the gap larger than a half of the difference between the interval of the barrier ribs facing each other and the width of the respective openings, the phosphor layers were formed on the tops of the barrier ribs, however, with the gap less than a half of that, the phosphor layers were not formed on the tops of the barrier ribs.

In the embodiments described hereinbefore, formation of monochromatic phosphor layers only was explained by way of example, however, the phosphor layers in three colors, R, G, and B, can be formed in practice by forming the phosphor layers in two additional colors with the use of varying kinds of phosphor substance.

As described in the foregoing, with the use of the exposure system according to the invention, wherein divergent or diffused rays of light which are radiated at the time of exposure can reach to the underside of portions of the photomask, protruding between the barrier ribs facing each other, the shadow of the photomask is not cast on critical regions of the phosphor layer forming layer, thereby enabling formation of the phosphor layers in desired shape with less light exposure in comparison with the case of utilizing collimated rays of light. Further, since the structure of the exposure system according to the invention is made simpler than that of the conventional exposure systems for radiating collimated rays of light, the cost of the system itself is lower, achieving reduction in cost.

What is claimed is:

1. An exposure system comprising:

a photomask for use in a process for forming phosphor layers of a plasma display panel, wherein the phosphor layers are formed by forming photosensitive phosphor layer forming layers at least between barrier ribs, facing each other, provided on a work substrate, and by exposing via said photomask after alignment of said photomask with the work substrate, developing, and heat treating the photosensitive phosphor layer forming layers;

an exposure light source composed of a plurality of light sources disposed such that divergent rays of light are radiated from above said photomask; and a mechanism for oscillating said plurality of light sources in relation to said photomask aligned with the work substrate or a mechanism for oscillating said photomask aligned with the work substrate in relation to said plurality of light sources.

2. An exposure system comprising:

a photomask for use in a process for forming phosphor layers of a plasma display panel, wherein the phosphor layers are formed by forming photosensitive phosphor layer forming layers at least between barrier ribs, facing each other, provided on a work substrate, and by exposing via said photomask after alignment of said photomask with the work substrate, developing, and heat treating the photosensitive phosphor layer forming layers;

an exposure light source composed of a plurality of light sources such that diffused rays of light are radiated from above said photomask;

a diffusion glass disposed between the plurality of said light sources and the work substrate; and a mechanism for oscillating said exposure light source in relation to the photomask aligned with the work substrate.

3. An exposure system comprising:

a photomask for use in a process for forming phosphor layers of a plasma display panel, wherein the phosphor layers are formed by forming photosensitive phosphor layer forming layers at least between barrier ribs, facing each other, provided on a work substrate, and by exposing via said photomask after alignment of said photomask with the work substrate, developing, and heat treating the photosensitive phosphor layer forming layers;

an exposure light source composed of a plurality of light sources such that diffused rays of light are radiated from above said photomask;

a diffusion glass disposed between the plurality of said light sources and the work substrate; and a mechanism for oscillating said photomask aligned with the work substrate in relation to the exposure light source.

* * * * *